(12) United States Patent
Pierotti Ferreira (10) Patent No.: US 8,398,309 B2
(45) Date of Patent: Mar. 19, 2013

(54) FLANGED BUSHING

(75) Inventor: Roberto Pierotti Ferreira, Sao Paulo (BR)

(73) Assignees: MAHLE International GmbH, Stuttgart (DE); MAHLE Metal Leve S/A, Jundiaí, SP (BR)

( * ) Notice: Subject to any disclaimer, the term of this patent is extended or adjusted under 35 U.S.C. 154(b) by 259 days.

(21) Appl. No.: 12/733,466

(22) PCT Filed: Sep. 3, 2008

(86) PCT No.: PCT/IB2008/002320
§ 371 (c)(1),
(2), (4) Date: Jun. 9, 2010

(87) PCT Pub. No.: WO2009/031027
PCT Pub. Date: Mar. 12, 2009

(65) Prior Publication Data
US 2010/0266228 A1    Oct. 21, 2010

(30) Foreign Application Priority Data
Sep. 4, 2007    (BR) .................................... 0703980

(51) Int. Cl.
*F16C 9/02*    (2006.01)
(52) U.S. Cl. ...................................................... 384/275
(58) Field of Classification Search .................. 384/275, 384/296, 294, 288, 429, 430
See application file for complete search history.

(56) References Cited

U.S. PATENT DOCUMENTS

| 4,076,342 | A | | 2/1978 | Thorpe | |
| 4,533,261 | A | | 8/1985 | Losio | |
| 5,062,718 | A | * | 11/1991 | Lenhard-Backhaus et al. | 384/294 |
| 5,114,246 | A | | 5/1992 | Gowan | |
| 5,145,264 | A | * | 9/1992 | Bryden et al. | 384/275 |
| 5,462,365 | A | * | 10/1995 | Brandt | 384/294 |
| 2003/0128902 | A1 | * | 7/2003 | Kennedy | 384/275 |

FOREIGN PATENT DOCUMENTS

| DE | 40 15 256 | 11/1991 |
| DE | 40 41 557 | 6/1992 |
| DE | 42 04 988 | 6/1993 |
| EP | 0 515 657 | 12/1992 |
| GB | 2 210 113 | 6/1989 |
| GB | 2 225 392 | 5/1990 |
| GB | 2 225 393 | 5/1990 |
| GB | 2 241 751 | 9/1991 |
| GB | 2 241 752 | 9/1991 |
| WO | WO 92/11468 | 7/1992 |

OTHER PUBLICATIONS

International Search Report.
Written Opinion of the International Searching Authority.

* cited by examiner

*Primary Examiner* — Thomas R Hannon
(74) *Attorney, Agent, or Firm* — Collard & Roe, P.C.

(57) ABSTRACT

A flanged bushing comprising a slide bearing (1), which has at least one half-ring-shaped or ring-shaped axial bearing (2) affixed to the side (6) of the bearing, this side being formed by its thickness, where recesses are provided with geometry cooperating with those of the locking elements, resilient fixation protrusions (3), arranged on the axial bearing (2), angularly distributed along its perimeter, like protrusions (3), which are radially of the inner diameter of the axial bearing (2).

6 Claims, 5 Drawing Sheets

FLANGED BUSHING

CROSS REFERENCE TO RELATED APPLICATIONS

This application is the National Stage of PCT/IB2008/002320 filed on Sep. 3, 2008, which claims priority under 35 U.S.C. §119 of Brazilian Application No. PI0703980-8 filed on Sep. 4, 2007. The international application under PCT article 21(2) was published in English.

FIELD OF INVENTION

The present invention relates to a flanged bushing comprising a slide bearing coupled to an axial bearing through elastic fixation protrusions.

PRIOR ART

The future generations of Diesel and Otto engines will increase the axial load on the surface of the crankshaft disc due to the need for greater combustion pressure, leading to the employ of a greater clutch pressure while changing gear, and so to a greater reaction on the internal axial bearings. As a result, the axial reactions on slide bearings that use flanges will also undergo an increase in load, thus impairing the life of the product if the latter is not properly developed.

The possibility of mounting different materials on the slide bearing and on the axial bearing facilitates the application thereof and increases the lifespan of the assembly. The use of this type of product is influenced by the convictions of the companies that produce engines, which can opt for backing washers, pure axial bearings, totally separated from the slide bearings or by shells with hard flange, single piece, and shells with mounted flange, flange fixed to the shell in a flexible way, obtaining the benefits of adaptation to the deformations, housing and mount, as well as the typical vibrations of internal combustion engines.

In addition, in order to guarantee the fixation of the backing washer to the shell, it is necessary to restrict it in three directions, but keeping it flexible, free from rigid links, permitting it to accommodate the distortions and vibrations characteristic of the engines. First restriction, the rotational one, bears the strains generated by the friction between the backing disc of the crankshaft and the slide surface of the axial bearing, friction torque. The second restriction, the radial one, prevents the flange from loosening totally and falling onto the drive shaft. The third restriction is axial, bears the vibration strains of the drive shaft. All these restrictions should guarantee that the flange will not get loose while being transported until the machine is assembled or during the lifespan of the latter.

Various types of fixation have been proposed, as for example, soldering, gluing, crushing or resilient fixation. Due to the high manufacture costs caused by the minor geometries and inadequate processes, these types of fixation become prohibitive. The process by resilient joining does not introduce residual strains that can lead to failure by fatigue, and the axial mounting facilitates the production flow, reducing the cost of the product.

A few examples of the prior art that can be cited are those described in the patent documents cited hereinafter.

Patent Document U.S. Pat. No. 4,076,342 relates to a flange having, in its internal diameter, a thinner cross-section which is received in a channel in the back of the shell on the steel side, guaranteeing retention in axial direction. The fixation relies on two protrusions located at the ends of the flange and two recesses equally in the shell. With the radial mounting the shell deforms and allows the recesses of the ends to receive the flange protrusions, whereby the thin section of the flange is fitted into the channel.

Patent Document U.S. Pat. No. 4,533,261 relates to the mounting of the flange in radial direction of the shell and the process of mounting is an interaction of the toughness of the bushing with that of the flange. The flange has two spaced protrusions close to the ends, provided with convex prisms, responsible for fixation of the parts, with the aid of hook-shaped recesses in the shell. The mounting is of the "click"-type, working with the two elements, shell and flange, in the elastic phase, since when pressing the flange protrusions exactly onto bushing recesses, flange and bushing give way and enable the protrusions to fit into the recesses.

Patent Document GB 2,210,113 relates to a solution in which the flange is mounted onto the shell in the radial direction where the first protrusion to fit is a central one and, by elastic deformation of the shell, others located at the and of the flange fit into cooperating recesses at the end thereof, which may be shaped like a "swallow-tail", a chamfer or a notch at the time of stamping the bushing.

Patent Document GB 2225392 relates to a solution having at least one protrusion for the fixation at the flange, centrally located and axially mounted and plastically locked by means of punctioning. The protrusion has lateral recesses formed during the stamping process which operates as holders the receive the bearing's plastically deformed material.

Patent Document GB 2,225,393 relates to a solution similar to the one revealed in patent GB 2,225,392, but with more than one protrusion projecting out of the plane to minimize the material to be used in forming the crankshaft relief spoke.

Patent Document GB 2,241,752 relates to a solution in which the flange has protrusions that are formed into the bushing recesses, which in turn undergo external action, opening the material beside the flange protrusions in the bushing region, thus fixing them.

Patent Document U.S. Pat. No. 5,114,246 relates to a solution in which the flange is axially mounted on the bushing. The backing washer is mounted on the bushing through cooperation between the protrusions and the recesses in the bushing. After insertion of the protrusions into the recesses thereof, they are smashed, whereby the flange is fixed.

Patent Document EP 0515657 relates to a solution in which the flange is fixed to the shell by plastic deformation of one of the fixation protrusions, the latter passing through a slot located in the bushing side in the center of the region of the trailing recess of the crankshaft spoke, apart from the protrusion, which remains exposed in the recess is smashed by a wedge, deforming the recess in the form of a "V", thus preventing the flange from loosening from the radial direction. This design offers a great risk to the crankshaft spoke and may scratch it, thus impairing the assembly. Preventing rotation motion of the flange is achieved with rigid, non-deformable protrusions, fixed in bushing recesses, which may be open or slot-shaped.

Patent Document DE 4041557 relates to a solution of radial mounting by elastic deformation of the shell, enabling the introduction of hook-shaped recesses, which engage with the bushing recesses.

For a better understanding, a table is provided hereinafter, which brings together the cited patent documents according to their mounting characteristics or fixing type.

TABLE 1

Technical solutions for mounting a flange

| Pat. Number | Filing date | Mounting direction | | Type of fixing solution | | |
|---|---|---|---|---|---|---|
| | | Axial | radial | "click" | Elastic | Plastic |
| U.S. Pat. No. 4,533,261 | Jun. 6, 1985 | | x | x | x | |
| GB2210113 | 25 Aug. 1988 | | x | x | X | |
| GB2225392 | 25 Nov. 1988 | x | | | | x |
| GB2225393 | 25 Nov. 1988 | x | | | | x |
| GB2241751 | 02 Mar. 1990 | x | | | | x |
| U.S. Pat. No. 5,114,246 | 03 Dec. 1990 | x | | | | x |
| DE4041557 | 22 Dec. 1990 | | x | x | X | |
| EP0515657 | 17 Dec. 1991 | x | | | | x |

As demonstrated above, various ideas for the solution of mounting a flange were proposed, many of them with subtleties that depend on fractions of an angle to guarantee the fixation or even the tenths of a millimeter for the same function.

Often the locking elements are plastically deformed, impairing the life of the assembly, because they are so thin that they may crack, or even they may never be produced due to their great complexity. Soldering and gluing have been used as a fixing means, which makes the system extremely rigid, with loss of the benefit of flexibility of the flange with respect to the bushing or shell.

However, none of the above solutions presents an axial mounting by flexible engagement, which does not impair the integrity of the fixing element, since it does not deform the latter. This is done within feasible geometries and dimensions in the present-day manufacturing processes and is what is proposed in the present invention.

OBJECTIVES OF THE INVENTION

Therefore, an objective of the present invention is to provide a flanged bushing containing a slide bearing, which may be a bushing that enables one to mount at least one axial bearing in the form of a half-ring or ring, called also backing washer or flange, which can be affixed, fitted or even mounted, permitting relative moments, at the side of the shell or bushing, by elastic fixing claws, called herein resilient fixation protrusions, which are extensions of the inner diameter, having corresponding recesses of cooperating geometry on the slide bearing.

It is also an object of the present invention to provide a slide bearing with the axial bearing, a flange for a better arrangement with respect to the assembly mounted on a machine and its drive shaft by reason of the action of the clearances inherent in the assembly of the recess with the resilient fixation protrusions.

A further objective of the present invention is to enable the mounting of different materials between the axial bearing and the slide bearing. Thus, one can mount a polymeric flange onto a slide bearing made of a metallic composite, or vice-versa, both with tribological properties suitable for application, as well contributing to the technological development of the machines.

ADVANTAGES OF THE INVENTION

A few advantages of the invention are described hereinafter, and it should be pointed out that they are not the only ones of the present invention. Other advantages and their characteristics will be presented along the description of the embodiments of this invention.

With the present invention, the process of manufacturing the slide bearing is facilitated. It provides a distinct manufacture of the parts involved separately and put together at the end of the two process at a third possible place, thus making it possible to choose the processes, materials and manufacture places, which results in better cost/benefit and grated social return.

The present solution enables the maintenance of the axial bearing, since the dismounting/mounting of the shell flange does not cause damage to any of the parts, rendering the product more advantageous for the final customer, user of the machine.

BRIEF DESCRIPTION OF THE INVENTION

The objectives of the present invention are achieved by means of a flanged bushing having a slide bearing with a flange mounted thereon, object of the present invention, which has at least one resilient fixation protrusion and another rigid protrusion, both of them fitting into cooperating recesses that are angularly spaced by an angle $\alpha$.

By means of an external reinforcement, the protrusions are deformed and then placed within the recess of cooperating geometry. After this, the protrusions are released, and the original position being restored and these protrusions being accommodated to the recess, which prevents them from loosening by virtue of the stops.

The protrusions housed in the recesses have the three characteristics of preventing the separation of the shell/flange assembly in the three main directions:

(i) In the axial direction, is prevented by enclosing the protrusion in a cooperating geometry, stops, within the recess;
(ii) In the radial direction, is prevented due to the angular distribution of the protrusions and by the internal stops; and
(iii) In the circumferential direction, which refers to the friction torque imposed by the work of the crankshaft mirror on the slide material of the flange, is prevented by the existence of the protrusions in the recesses and the rigid protrusion, which impose mechanical resistance to shear and crushing, as well as fatigue, maintaining the function of the flange.

According to the present invention, there may be from 1 to 6 recesses per 180° of plane shell and respective resilient fixation protrusions.

This elastic deformation is permitted by virtue of the reserved space, which will receive the protrusions in the deformed condition. The recesses, in turn, are located at the side of the slid bearing, forming a angle $\gamma$ between 30° and 60°, preferably 45°, with the inner surface of the recess, which generates the bump.

This same cooperating geometry, in the form of the surface, is present in the protrusions. At the base of the protrusions for fixing the axial bearing, there are strain relief means for guaranteeing the elasticity of the deformation at the time of mounting/dismounting the flange.

The material used in making the shell and the flange of the present invention is carbon steel with adhesion and slide material, with tribological properties suitable for the drive shaft. A polymeric material may also be used on such bearings, namely: plastic resin, epoxy resin, material containing fluorene or fluoropolymer.

BRIEF DESCRIPTION OF THE DRAWINGS

The present invention will now be described in greater detail with reference to an embodiment represented in the drawings. The figures show.

DETAILED DESCRIPTION OF THE FIGURES

The present inventions refers to a flanged bushing having as elements a plane bushing, a slide bearing, a flange, an axial bearing is provided.

The shell has recesses that are located at its side, formed by the thickness. The recesses have the shape of a swallow-tail, trapeze with an open smaller base, the trapezes having the side walls inclined with angles formed between the sides and the larger base, which may assume values between 15° and 60°, preferably 45°. The side walls serve as trapping stops of the fixing elements, which are on the flange.

The fixing elements are an integral part of the flange, protrusions that show up from the inner diameter and have a respective recess in the shell. The protrusion is thin and finger-shaped. It is formed by eliminating the material around it at the base, which keeps it as a part of the flange, which has a strain relieving geometry imparting to the protrusion the property of being an elastic element. One of the side empty spaces of the protrusion is for the purpose of temporarily accommodating its elastic deformation for mounting the shell. Another empty space will serve for removing the flange, at a moment of maintenance. These protrusions have at their ends, further from the inner diameter of the flange, chamfers that are equivalent to the angles of the side walls of the recesses. Once housed in the recesses, the geometries of the flange and of the recess wall cooperate with each other so as to fix the flange to the shell.

The fixation of the flange to the shell compulsorily takes place in the three main directions: axial, radial, rotational. The axial fixation is provided by the stops and by the cooperating geometry of the chamber.

The radial fixation is effected by distributing recesses and protrusions along the 180° of the shell and of the flange, respectively, so that the stops will be in divergence with the loosening movement.

The rotational fixation, the movement is prevented by the section resistant to the cooperating protrusion shear and to the crushing of the chamfer and the stop.

The mounting of the flange on the shell takes place with the elastic deformation of the protrusions to such an extent that it will be capable of passing through the smaller base of the recess trapeze. Once this has been done, the protrusions are released for returning to the original non-deformed state, engaging with the stops and making the dismounting impossible.

The great advantage of this idea is to provide the axial mounting without residual strains and fatigue, linked to the processes of soldering or stamping material, thus facilitating the manufacturing process and reducing the mounting cost.

Figure 1:
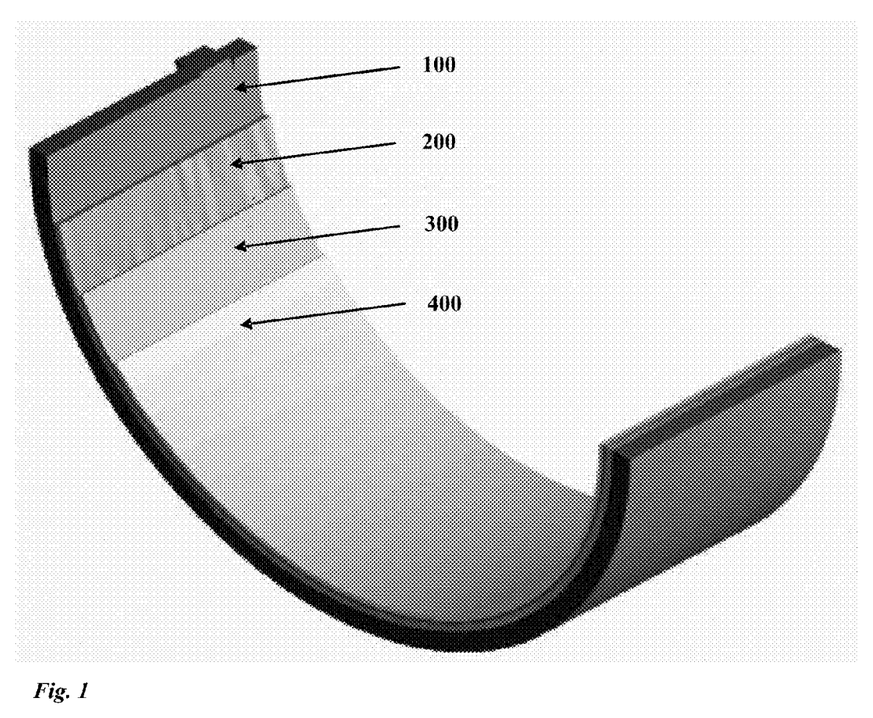
FIG. 1 is a composition of a radial bearing, which in turn is extended to the axial bearing, since it is the same raw material, a composite of a slide material plus a structural material.

With reference to FIG. 1, it shows a slide bearing and its various layers of specific materials. Layer 100 is the structure of the piece, made of steel, which guarantees retention in the housing; 200 is emergency slide material for the event of lack of lubricating oil; 300 is an anti-spread barrier for preventing the spread of materials between the layers; 400 is a rolling layer, which accepts the touch of the shaft, adjusting itself and receiving impurities from the engine lubricating oil. This demonstration extends to the axial bearing, since the raw material, steel plate plus layers of specific materials may be adapted to originate both axial bearing and radial bearing.

Figure 2:
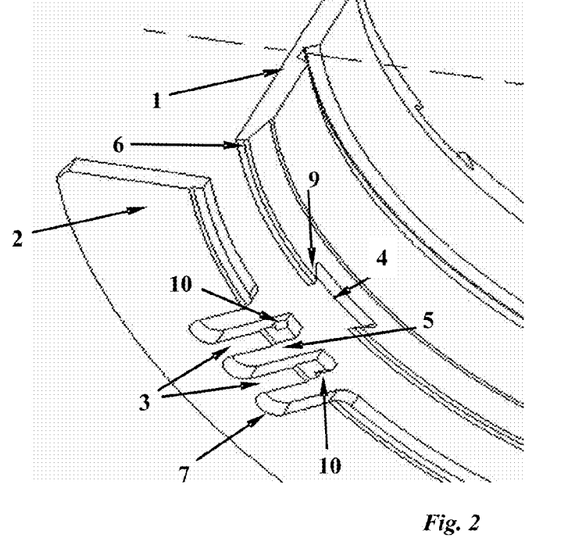
FIG. 2 is a view of the axial bearing and slide bearing, as well as a detail of the resilient fixation protrusion and it recess with a cooperating geometry.

In FIG. 2, one observes the bearing of the present invention in a detailed exploded view of the layer 1 and bearing 2. The position is prior to the insertion of the resilient fixation protrusions 3 into the recess 4. The resilient fixation protrusion 3 is a thin element, the geometry of which results from the design, the premise of which is to guarantee resilience depending on the materials used, namely a composite.

The space 5 adjacent the protrusions is the region where these protrusions are deformed to such an extent, as defined in the piece design, that will not exceed the crushing limit of the materials employed therein, and that the latter can enter into the recess 4. The deformation for mounting the resilient protrusions 3 into the space 5 is produced by an external force F, as shown in FIG. 7. The strains, due to the deformation for mounting, at the base of the resilient protrusions 3, are minimized by introducing rounded surfaces 7, adjacent the resilient fixation protrusions 3, classically recognized in the technical literature as being useful for this purpose. The resilient fixation protrusions have at their ends surfaces 10 that cooperate with the surfaces formed by the stops 9, when the flange 2 is mounted on the shell 1. The recess 4, which contemplates the stops 9, develop swallow-tail shape and the surfaces 10 at the ends of the two resilient fixation protrusions 3 cooperate for the fixation by virtue of the similarity of the geometries. The fixation of the flange in the axial direction is guaranteed by the impediment brought about by stop 9 to the surface 10.

Figures 3A, 3B:
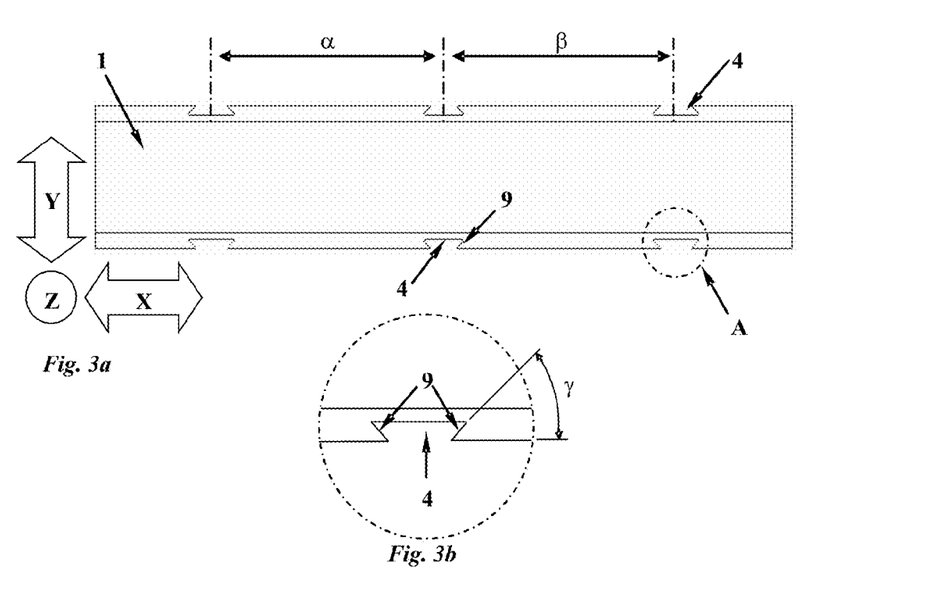
FIGS. 3a and 3b are the development of the slide bearing with the details of the recesses and the respective positioning.

FIGS. 3a and 3b illustrate that a shell 1 is developed with the respective recess positions appropriately distributed along it. In this position, one can clearly see the swallow-tail geometry, the form of a trapeze, which has the reference numbers 9 and 4. The recesses 4 have the function of preventing the release of the flange 2 from the shell 1 in the directions X (circumferential), Y (axial), Z (radial). The impediment is due to the shape of the stop 9, which as an angle y suitable for this function. The angle y has a geometry cooperating with that of the surface 10, which is at the end of the resilient fixation protrusions 3.

Figure 4:
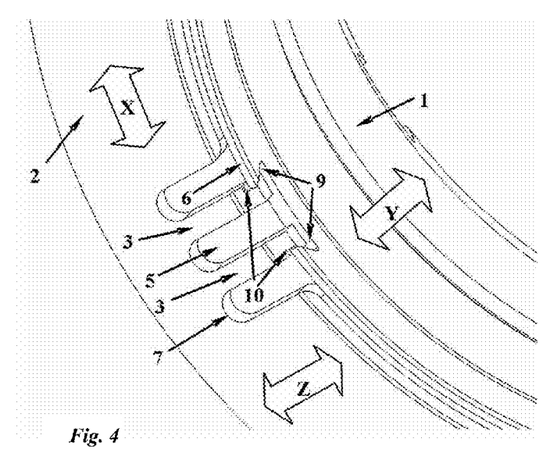
FIG. 4 is the flange mounted on the slide bearing and the resilient fixation protrusions perfectly fitted into the recesses, as well as the illustration of the main directions (X,Y,Z) of fixation of the mounted flange.

With reference to FIG. 4, one observes a bearing with the resilient protrusions 3 already inserted into the recesses 4, guaranteeing the fixation of the axial bearing 2 to the slide bearing 1 on the axis X (rotational), Y (axial) and (radial) shown by the arrows. The impediment at Z takes place with addition of a second, third or more groups of resilient fixation protrusions, spaced from each other angularly, as shown in FIG. 2. The perfect engagement between the stops 9 and the surfaces 10 takes place by virtue of the similarity thereof, cooperating so as to prevent the release of the flange 2 from the shell 1, in the directions X, Y and Z.

Figure 5A:
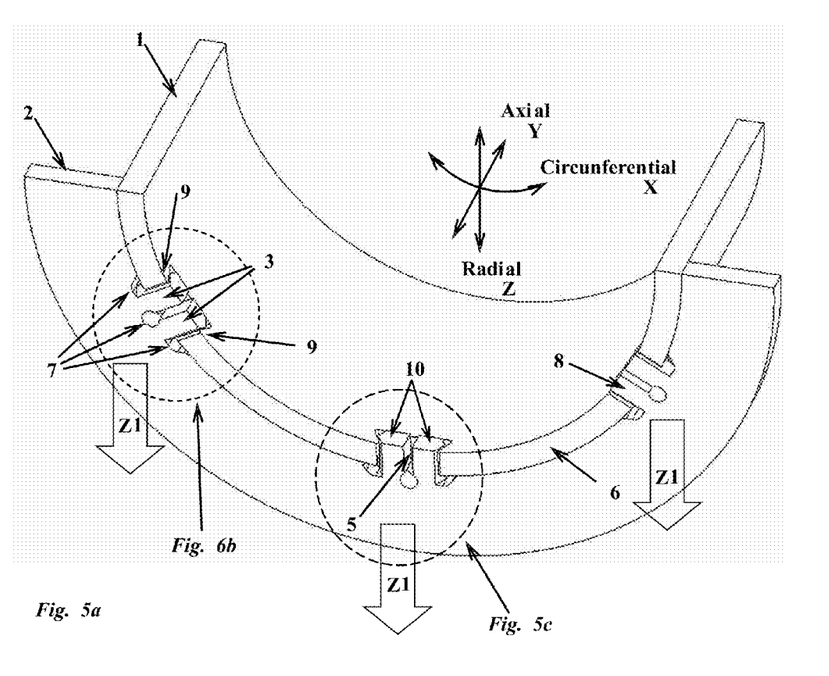
FIGS. 5a-5c show a mounted flanged bushing with three sets of resilient fixation protrusions, arranged circumferentially along the flange, the main locking directions, axial, radial and circumferential directions of the flange on the shell, as well as two details.
Figure 5B:
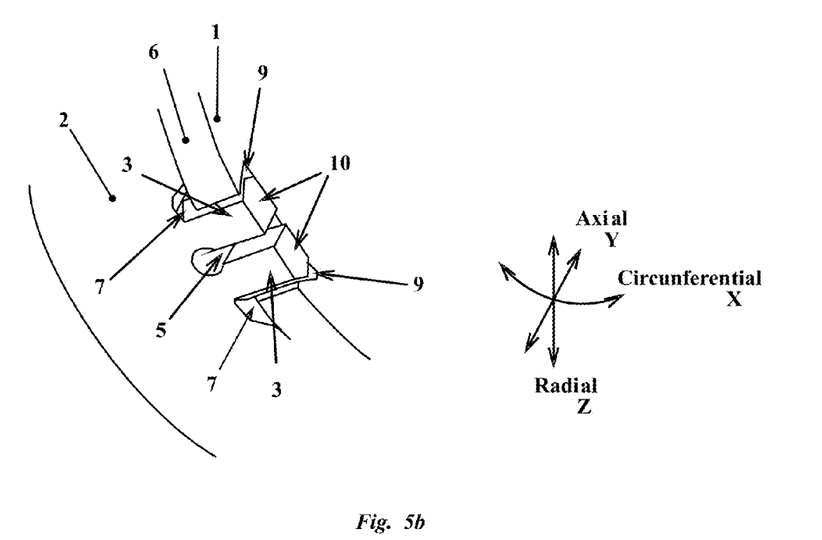
Figure 5C:
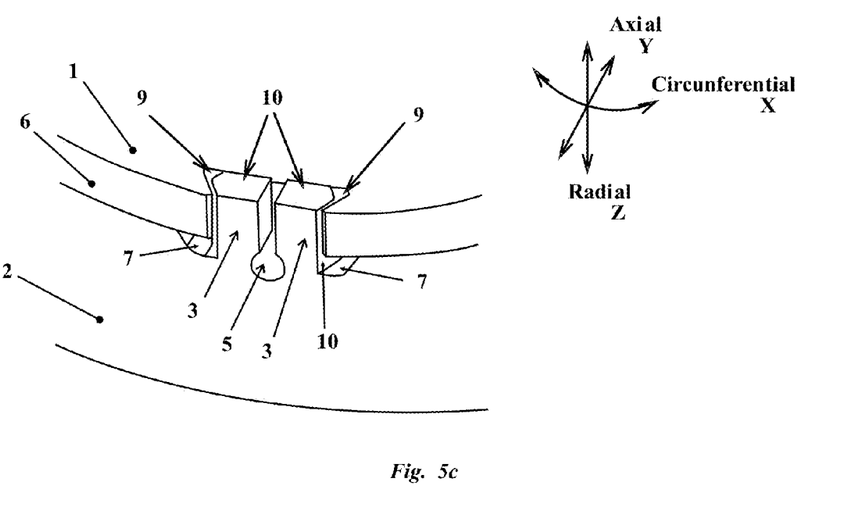

FIGS. 5a-c illustrate a flanged bushing mounted with three sets of resilient and rigid fixation protrusions 3, and 8, respectively, arranged circumferentially along the flange, the main directions of locking: axial, radial and circumferential of the flange 2 on the shell 1 It further presents arrows, designated as Z1, which refer to an effort of a fictitious detachment in the radial direction, but as an illustration of the attempt to separate the flange from the shell. In the FIG. 5b, the application of a fictitious force Z1 to detach the flange 2 from the shell 1 generates on the shall 1 a contrary reaction R in the region of the stop 9, of the same intensity on the surface 10, located at the end of the protrusion 3, preventing the separation. In this way, no matter where such a radial force Z1 is applied, the flange and the shell will always be reacting by one or more of its groups of resilient fixation protrusions 3 and their related stops 9 with the proper cooperation of the angle y and of the surface 10. FIG. 5c shows the resilience of the release of the flange 2 from the shell 1 in the main directions X (circumferential) and Y (axial). The release in the axial direction, Y, through the opening of the recess 4, is prevented by opposition of the stops 9 to movement of the surfaces 10 of the resilient fixation protrusions 3. Since the opening of the recess 4 is smaller than that of the whole flange, formed by movement of the surfaces 10 of the set of resilient fixation protrusions 3 apart from each other, the detachment of the flange 2 from the shell 1 is prevented. The release of the flange 2 from the shell 1 in the circumferential direction X, which is correlated with the friction torque of the crankshaft mirror in contact with the slide material of the flange, is prevented by the interpenetration of the respective cooperating geometries 9 and 10 present on the shell 2 and at the ends of the resilient fixation protrusions 3.

Figure 6:
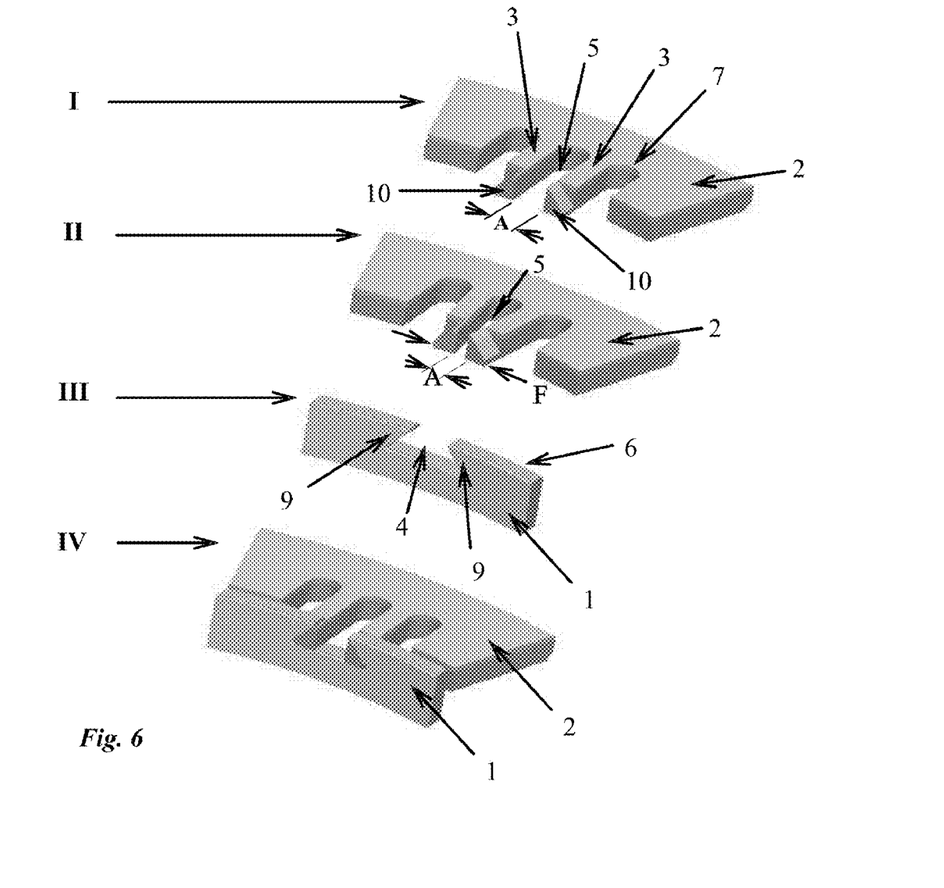
FIG. 6 is an exploded view of an assembly, and, in particular, the elastic deformation of the resilient fixation protrusions.

FIG. 6 schematically shows the mounting sequence, in the following steps:

Step (I)—where there is a detail of the flange 2 in the free position and a group of fixation protrusions 3 with the initial, free separation A1.

Step (II)—the resilient protrusions 3 already elastically deformed by the external force F into the space 5, so as to assume the separation A2, with the possibility of entering into the shell housing 4, which is at its side 6.

Step (III) the recess 4 with the stops 9 of cooperating geometry and the thickness of the shell 6 awaits the insertion of the resilient protrusions 3, already deformed.

Step (IV)—the flange 2 mounted in the shell recess 4 and the resilient protrusions 3 back in the initial position, separation A1, due to the elastic property which they have, without external aid, perfectly engaging with each other by virtue of the geometries 10, which cooperate with the stops 9, guaranteeing the axial fixation Y.

A preferred embodiment having been described, one should understand that the scope of the present invention embraces other possible variations, being limited only by the contents of the accompanying claims, which include the possible equivalents.

The invention claimed is:

1. A flanged bushing comprising:
   a slide bearing formed by a shell or bushing,
   at least one axial bearing mounted on the slide bearing and being composed of a slide material, the axial bearing being half-ring shaped with a flange on a side thereof,
   wherein the slide bearing has recesses which have stops formed thereon and which receive through openings of said recesses at least one rigid protrusion and at least one resilient fixation protrusion, wherein a surface of said at least one resilient fixation protrusion has a cooperating geometry allowing for fixation with said recesses, said resilient fixation protrusions having a strain relieving geometry at their bases and having an adjacent space for accommodating a mounting deformation, and
   wherein said rigid and fixed protrusions are distributed in a number and position equal to a number and position of said recesses to fix the protrusions within the recesses to thereby fix the flange.

2. The flanged bushing according to claim 1, wherein the resilient fixation protrusions are extensions of the inner diameter of the flange.

3. The flanged bushing according to claim 1, wherein the resilient and rigid fixation protrusions as well as the recesses are angularly arranged.

4. The flanged bushing according to claim 1, wherein the stop has an angle with a bottom of the recess, said angle being between 30 degrees and 60 degrees.

5. The flanged bushing according to claim 1, wherein there are from 1 to 6 recesses and fixation protrusions for each 180 degrees of slide bearing.

6. The flanged bushing according to claim 1, wherein the flange is made of a polymeric material.

\* \* \* \* \*

UNITED STATES PATENT AND TRADEMARK OFFICE
CERTIFICATE OF CORRECTION

PATENT NO. : 8,398,309 B2  Page 1 of 1
APPLICATION NO. : 12/733466
DATED : March 19, 2013
INVENTOR(S) : Roberto Pierotti Ferreira It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

Signed and Sealed this
First Day of September, 2015

Michelle K. Lee
*Director of the United States Patent and Trademark Office*